(12) United States Patent
Stankiewicz et al.

(10) Patent No.: US 8,843,497 B2
(45) Date of Patent: Sep. 23, 2014

(54) SYSTEM AND METHOD FOR ASSOCIATION EXTRACTION FOR SURF-SHOPPING

(75) Inventors: Zofia Stankiewicz, New York, NY (US); Satoshi Sekine, Scarsdale, NY (US)

(73) Assignee: Linkshare Corporation, New York, NY (US)

( * ) Notice: Subject to any disclaimer, the term of this patent is extended or adjusted under 35 U.S.C. 154(b) by 0 days.

(21) Appl. No.: 13/607,967

(22) Filed: Sep. 10, 2012

(65) Prior Publication Data
US 2013/0212110 A1   Aug. 15, 2013

Related U.S. Application Data

(60) Provisional application No. 61/597,032, filed on Feb. 9, 2012.

(51) Int. Cl.
*G06F 17/30* (2006.01)
*G06Q 30/06* (2012.01)

(52) U.S. Cl.
CPC ...... *G06F 17/3071* (2013.01); *G06F 17/30713* (2013.01); *G06Q 30/0631* (2013.01)
USPC .......................................................... 707/740

(58) Field of Classification Search
CPC .......... G06F 17/3071; G06F 17/30713; G06Q 30/0631
USPC .......................................................... 707/740
See application file for complete search history.

(56) References Cited

U.S. PATENT DOCUMENTS

| | | | |
|---|---|---|---|
| 2007/0299743 A1* | 12/2007 | Staib et al. | 705/27 |
| 2008/0195596 A1* | 8/2008 | Sisk et al. | 707/5 |
| 2010/0269062 A1* | 10/2010 | Kobylinski | 715/781 |
| 2011/0010324 A1* | 1/2011 | Bolivar et al. | 706/46 |
| 2012/0041952 A1* | 2/2012 | Sohma | 707/737 |
| 2012/0166308 A1* | 6/2012 | Ahmed et al. | 705/26.41 |

OTHER PUBLICATIONS

Mei, Qiaozhu, et al., Automatic Labeling of Multinomial Topic Models, KDD 2007, Aug. 12-15, 2007, San Jose, California, USA.
Lau, Jey Han, et al., Automatic Labelling of Topic Models, Proceedings of the 49th Annual Meeting of the Association for Computerized Linguistics, Jun. 19-24, 2011, pp. 1536-1545, Portland, Oregon, USA.
Nagori, Rohit, et al., LDA Based Integrated Document Recommendation Modelfore-Learning Systems, Emerging Trends in Networks and Computer Communications, 2011 International Conference ON, IEEE, Apr. 22, 2011, pp. 230-233.
Daud, A., et al., Modeling Ontology of Folksonomy with Latent Semantics of Tags, Web Intelligence and Intelligent Agent Technology, (WI-IAT) 2010 IEEE/WIC/ACM International Conference on, IEEE< Aug. 31, 2010, pp. 516-523, Piscataway, NJ, USA.
Lu, Linyuan et al., Recommender Systems, Retrieved from Internet, URL:http://arxiv.org/pdf1202.1112.pdf, Feb. 7, 2012.
International Search Report to PCT/JP2013/053779.

* cited by examiner

*Primary Examiner* — Apu Mofiz
*Assistant Examiner* — Dara J Glasser
(74) *Attorney, Agent, or Firm* — Troutman Sanders LLP (57) ABSTRACT

The present disclosure is directed to a computer system and method performed by a selectively programmed data processor for providing data to a Web page such that items are presented to the user in a way that imitates a real world shopping experience. Various aspects of the disclosed technology also relate to systems and methods for calculating product or category associations using associative relation extraction. Additional aspects of the disclosed technology relate to automatic topic discovery, and event and category matching.

15 Claims, 4 Drawing Sheets

SYSTEM AND METHOD FOR ASSOCIATION EXTRACTION FOR SURF-SHOPPING

BENEFIT CLAIMS

This application claims the benefit of U.S. Provisional Patent Application No. 61/597,032, filed Feb. 9, 2012, the entirety of which is herein incorporated by reference.

FIELD OF THE INVENTION

The present invention relates generally to electronic commerce, and more specifically, to a networked based computer system and method for implementing performance and presentation enhancing protocols and system architecture to facilitate Web based commerce.

BACKGROUND OF THE INVENTION

Shopping on the Internet is vastly different from shopping in physical marketplaces in many ways. One significant difference is that the online shopping model is search-oriented, i.e. based on the user typing in a query and finding the corresponding products in the top results. Thus, online shopping is well suited to the goals of a user who has a specific type of product in mind that they would like to buy. Such a user wants to be able to find their choice product quickly or to compare close alternatives and variants of the same product.

On the other hand, many users simply enjoy the activity of shopping and like to browse a variety of different items before they decide to make a purchase. Such a shopping experience has traditionally been well suited only for offline or physical marketplaces, for example by walking into a department store or a shopping center and looking around. Search-oriented online shopping sites do not provide a full or satisfactory "look around" functionality.

The present invention seeks to address these and other problems to provide an enhanced online shopping experience, allowing, in part, for the user to experience the online equivalent of browsing around a physical marketplace and providing the user with relevant products.

OBJECTS AND SUMMARY OF THE INVENTION

It is therefore an object of the present invention to provide a network based computer system with an access portal presenting to users associated products.

It is another object of the present invention to provide a protocol for optimizing the associated products presented to the users.

It is yet another object of the present invention to provide associative relation extraction.

It is yet another object of the present invention to provide topic discovery for the product/e-commerce domain.

It is yet another object of the present invention to provide event and category matching.

The above and other objects of the present invention are realized in a specific illustrative embodiment thereof that comprises a selectively programmed computer platform and system connected to the Web.

Other features and advantages of the invention will become more apparent when considered in connection with the accompanying drawings and detailed description.

DETAILED DESCRIPTION

The present invention is directed to a computer system and method performed by a selectively programmed data processor for providing data to a Web page such that items are presented to the user in a way that imitates a real world shopping experience. Various aspects of the disclosed technology also relate to systems and methods for calculating product or category associations using associative relation extraction. Additional aspects of the disclosed technology relate to automatic topic discovery, and event and category matching. The particular embodiments described herein are exemplary and do not limit the scope of the disclosed technology.

Figure 1:
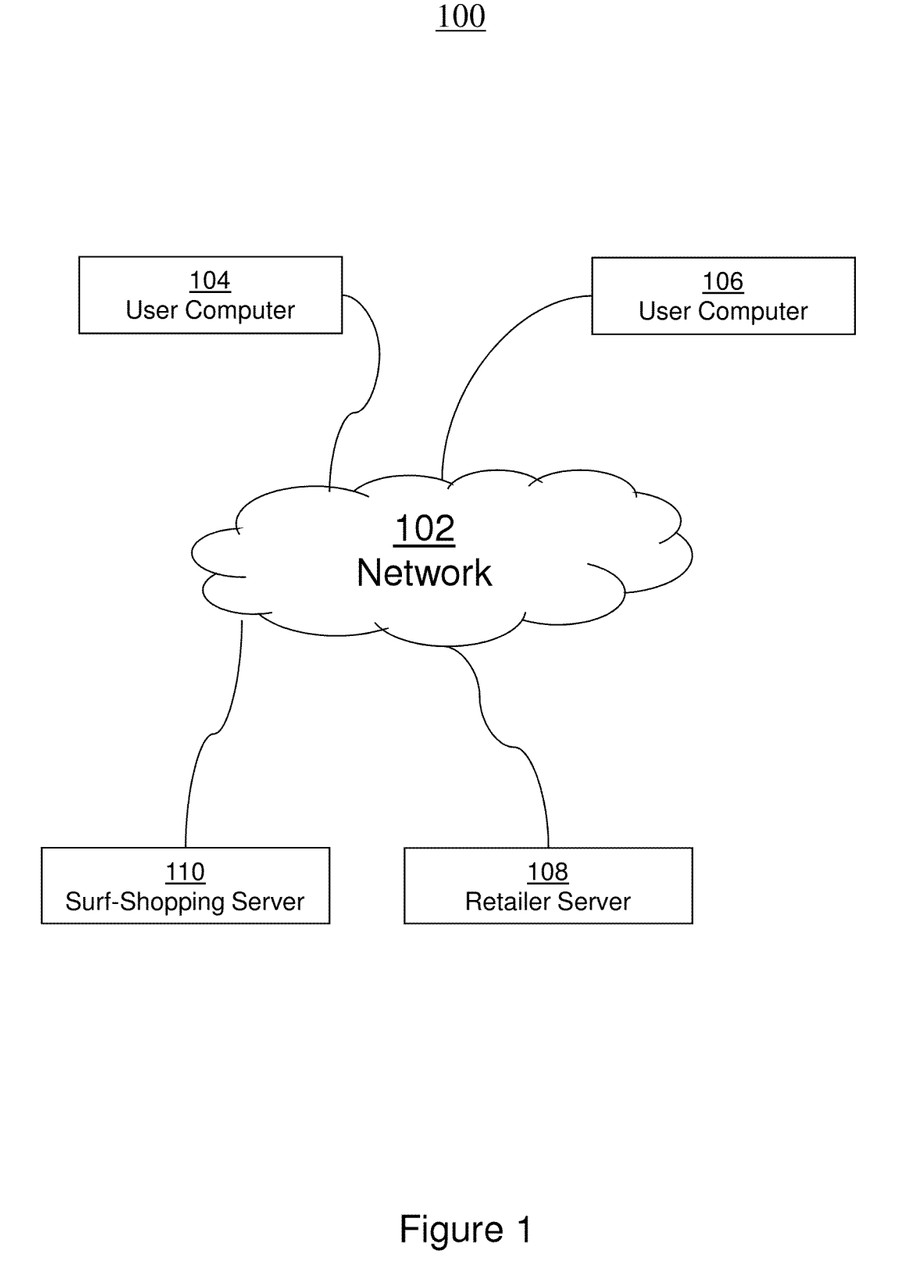
FIG. 1 is a block diagram illustrating an exemplary Internet marketplace environment, in accordance with one embodiment of the disclosed technology.

Referring now to FIG. 1, there is shown a block diagram of one embodiment of an Internet marketplace infrastructure 100 in accordance with the disclosed technology. The Internet marketplace infrastructure 100 includes a Network 102 that may include one or more telecommunication devices such as routers, hubs, gateways, and the like, as well as one or more connections such as wired connections or wireless connections. In different embodiments, the Network 102 can include different numbers of telecommunication devices and connections and can span a range of different geographies. In different embodiments, the Network 102 can include, among other things, all or portions of a wired telephone infrastructure, a cellular telephone infrastructure, a cable television infrastructure, and/or a satellite television infrastructure.

Various Internet marketplace participants are in communication with the Network 102, including one or more User Computers 104 and 106, a Retailer Server 108 and a Surf-Shopping Server 110. As used herein, the term "computer" includes any system or device that can execute machine instructions, including, for example, desktops, laptops, servers, cell phones, smart phones, handheld devices, television set top boxes, and/or networked computing systems, or multiples or combinations thereof. The Retailer Server 108 includes Web pages and Web server software that can provide the Web pages to systems or devices requesting them. The Web pages can include a myriad of different media and content, including, for example, shopping content. The Surf-Shopping Server 110 is operable to determine associative relationships between categories and products, build topic pages, and perform various other functions as described in detail below. The Surf-Shopping Server 110 may be part of Retailer Server 108 or may be an independent server.

The User Computers 104 and 106, Retailer Server 108, and Surf-Shopping Server 110 can each include hardware such as network communication devices, non-transitory storage medium/devices, processors, memory, and software such as operating system software, Web server software, and/or Web browsing software. In one embodiment, the User Computers 104 and 106 include a Web browser that can request Web pages from Retailer Server 108 and/or Surf-Shopping Server 110. Those skilled in the art will understand that a "Web page" refers to a collection of different things, including, for example, visual content displayed on a screen (e.g., text, picture, video, buttons, etc.), software code causing the visual content to be displayed, as well as other software code that do not cause anything to be displayed but perform certain functionality in connection with the Web page.

Figure 2:
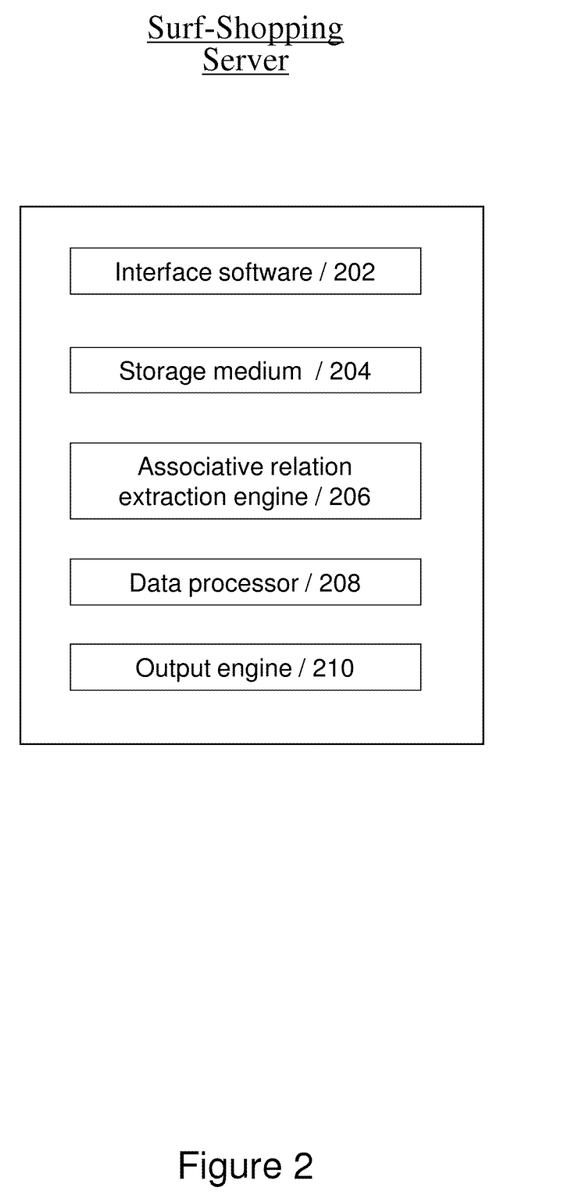
FIG. 2 is a block diagram of exemplary components in the Surf-Shopping Server 110 of FIG. 1, in accordance with one embodiment of the disclosed technology.

FIG. 2 illustrates exemplary components the Surf-Shopping Server 110 of FIG. 1, in accordance with one embodiment of the disclosed technology. Interface software 202 allows for user interaction with the Surf-Shopping Server 110. Storage medium 204 is operable to store selective programming, including the programming required to implement the Associative relation extraction engine 206, and Output engine 210. The Associative relation extraction engine 206 may be executed on Data processor 208 such the algorithms and methods described below are performed. Output engine 210 is operable to output, to a user computer or to a retailer server, the results of the Associative relation extraction engine 206, for example, a topic page.

In one embodiment, a user is able to look at products in a certain product category, for example wine. One of the system's goals is to determine which other categories would be of interest to the user and display such categories. For example, in the case of wine, it may be various types of wine, but also wine opening and storage utensils, as well as wine glasses or suitable food to serve with wine, such as cheese. These product categories may be defined within a "product ontology tree," which may be specific for each retailer. For example, retailer X may have a home goods category, with wine openers as a subcategory, and a food category, with drinks a sub category and wines as a sub category of the drinks category. In this example, all of the types of products mentioned above are assigned to different categories in the retailer's product hierarchy, often occurring far apart in the product ontology tree. Furthermore, user data may not be sufficient to find this type of associations since it may suffer from sparsity problem, or the related content found in this way may not be coherent enough so that displaying it together would provide an enjoyable surfing experience.

Given a category in retailer product hierarchy, for example pasta sauce as well as descriptions of products assigned to that category, the present invention extracts other associated categories, such pasta, tomatoes, olive oil and cheese in case of pasta sauce. This is achieved by creating a collection of "category documents" and employing a topic model algorithm which discovers hidden topics in this document collection.

Associated categories are then found based on the topics which are important for each category and co-occurrence of category names. In addition, associated categories can also be grouped according to topics they were assigned to, which provides a natural way to arrange the associated category information. For each related category, the disclosed invention selects example products and snippet sentences from product descriptions which illustrate the association. Furthermore, the disclosed invention also constructs topic pages, which list categories central to a given topic. The topic pages can be thought of as an equivalent of theme display in a store for example ingredients used in Italian cuisine.

Surf-Shopping Paradigm

Surf-Shopping can be defined as an online shopping paradigm which facilitates browsing and exploring a variety of products for users who would like to "look around" an online store. The target user who surf-shops is a user who does not necessarily have the intention of searching for a specific item, but rather visits the site to explore and enjoy the activity of shopping. Thus, the objective of a Surf-Shopping interface is to capture the user's attention and provide entertainment. The longer they remain on the site, the more likely they are to come across a product which they decide to purchase. Another function of Surf-Shopping is to expose the user to products they might not have been aware of, or thought of searching for, by displaying them among browsing suggestions.

Therefore, in a preferred embodiment, a Surf-Shopping interface comprises a variety of navigation options, and an appealing display. To entertain the user, the system should provide a variety of options which are relevant to the product selection that the user is currently viewing, which can serve as further possible directions to explore. Additionally, the items (product categories or products) which are displayed as relevant should be organized and displayed in an interesting and appealing way to encourage further surfing of the site. These elements are facilitated by a method for extracting associative relations between product categories and organizing those associations into themes/topics. The proceeding two sections introduce the components of the method and the data used in prototype experiments.

Preliminary Definitions and Data

Associative relations. Given the typical online retailer product category hierarchy, an associative relation exists between items which are not necessarily in the same semantic class, i.e. close in the product tree, but which are nevertheless perceived to be related conceptually. Examples of such relationships include cup and coffee or bicycle and helmet. Items may be considered to be associatively related because they participate in one activity or event type (cooking pasta involves pasta, pot, boiling water etc.), one item type serves as a container for another (tea, teapot) or they are frequently found together (handkerchief and compact mirror in a woman's handbag).

Aside from discovering a set of entities associatively related to a given entity, its members can also be grouped according to the theme or overall topic that connects them to the target entity. For example, entities related to cheese could include other food typically eaten at breakfast, or items related to use of cheese in cooking, in which case associated entities would be subdivided into two thematic groups. To give an example of a single topic, entities related to cheese grouped under the cooking theme, could include grater (tool to grate), pizza (cheese used as topping or sauce ingredient) or tomato sauce (ingredient combined with cheese).

Based on manual or automatic classification, category nodes can be divided into categories and attributes, with attribute nodes occurring lower in the tree. For example the children of a rice bowl category may include attributes which describe the material such as porcelain, ceramic, plastic and so on.

The term category refers to the set of products (and the corresponding product documents) under that category node in the hierarchy, whereas the term category name refers to the label given to a category. In one example, a simplifying assumption may be made that when the category name is used in a product document it refers to items in that category. In one example, each category has one name/label, but in principle that name could be replaced with a list of synonyms or keywords which are used to refer to the items in the category.

Method Summary

Described below is a method for finding associations between product categories in a selected domain, for example food and kitchen. Reference below is made to a specific experiment which considered only the category nodes from a food and kitchen domain (1088 in total), and it is understood that references to the specific example below are not limiting. In one embodiment, the method used to extract associative relations consists of the following steps:

1. Category Document Construction

For each category X in the domain construct an artificial document which consists of all the sentences which describe this category in relation to other categories Y, more specifically, include all sentences from descriptions of products in X which mention the name of at least one other category Y, as well as all sentences from descriptions of products in categories Y which mention the name of category X. The result is a set (corpus) of documents, one document per category.

2. Topic Discovery Using Latent Dirichlet Allocation (LDA)

Run a topic model using LDA on the corpus of category documents, which discovers hidden topics/themes in the documents. The results of the model provide main topics in the document collection (represented by words which are likely to appear in each topic), as well as dominant topics for each category document, and a topic label for each word in the document collection. The number of topics for a given corpus of documents has to be established empirically. For the food and kitchen domain, a number of topics ten times smaller than the number of categories is optimal. In one embodiment, in order to avoid topics which are too general, the top 10% of topics are discarded.

3. Selection of Related Categories for Each Category Document and Assignment of Categories to Topics For each target category, which are described in separate category documents, potential related categories are sorted according to their occurrence in the target category document or they are assigned a relation score based on the topic model results. Each related category is also assigned to one of the top topics in the target based on its overlap with top topics in the related category document.

4. Snippet and Sample Product Selection

Given the previous two steps, the assignment of a related category to a topic is known, and there is a set of sentences in the target category document that can serve as snippet candidates which illustrate the relationship between the target and the related category. For this sentence set the most frequent predicate argument structure containing one of the category names in the associated pair are found and those sentences are sorted according to how likely the words are to belong to the topic assigned to this particular associative relation. The products which had the top scoring snippets in their descriptions are selected as examples. Further example products can be searched in the product index by building a query from target category name and the words representative for the topic, and restricting the search results to items in the related category.

5. Selection and Clustering of Categories to Represent Each Topic

Figure 3:
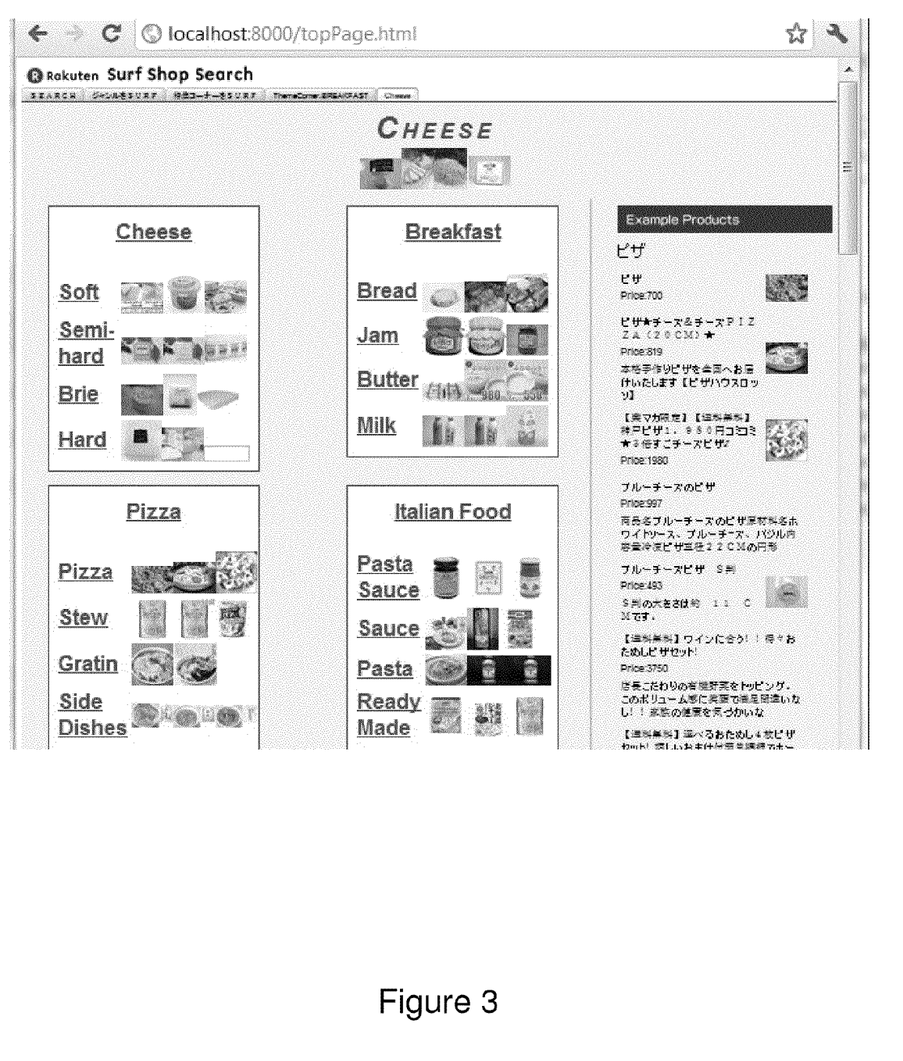
FIGS. 3-4 are screen shots of illustrative embodiments of the disclosed technology.

Since hidden topics were discovered in the collection of category documents using LDA, the results also make it possible to construct "topic pages", which could be seen as equivalents of a thematic display or a theme corner in a store. To build a topic page, category documents most likely under this topic are selected and a version of k-means clustering is used to group them according to distance in the product ontology tree, so that similar categories can be shown together and so that categories that do not fit together can be removed. A screenshot of an exemplary topic page, according to one embodiment of the disclosed invention, is shown in FIG. 3.

6. Topic Label Selection

The number of topics is far fewer than the number of categories in a given domain (for example 100 topics for the food and kitchen domain of 1088 categories), which permits manual topic label selection. In one embodiment, however, topic label selection is automated. Topic labels may be assigned by an annotator based on a selection of top topic keywords and the categories on the topic page.

Method Details

1. Category Document Construction

This section describes how to construct a category document given all product descriptions in that category. A collection of such documents for a given domain may then be used as input for the topic model clustering described in the next section.

First, all descriptions are tokenized, and parts-of-speech (POS) are tagged and segmented into sentences. Sentence segmentation in product descriptions is based on a simple Naive Bayes classifier which decides whether to segment when it encounters one of the splitter characters in a given set of about 20 characters (which may include not only punctuation but also stars, music notes and some other symbols). The features supplied to the classifier are: previous word, POS of previous word, the splitter character itself and distance from previous splitter (in words).

After segmentation, the description data is cleaned according to the following rules. Duplicate descriptions are removed, so are duplicate sentences if they come from product descriptions supplied by the same merchant. Sentences which differ only by punctuation or by a numeral are also considered duplicates. Furthermore, segments which do not contain any predicates (verb or adjective) or case particles are removed in order to exclude non-sentence segments such as keyword lists.

All sentences are grouped into separate documents based on the source category and they are assigned unique ids which contain the id of the category that the product description belongs to. The sentences are then filtered further, leaving only those sentences which contain a name of another category in the domain. This allows for the retention of sentences which potentially describe the relation between a given product category and other categories. It also helps remove metadata, such as shipping or packaging information. The data is kept in tokenized format, however, all substrings which match category names are concatenated to form single words (many category names consists of more than one token).

Important knowledge about a category x may also be contained in descriptions of products from other categories which mention the name of category x. Therefore, in the final step, each category document is augmented with sentences copied from descriptions in other categories, which contained the relevant category name.

The result is a set (corpus) of documents, one document per product category. It should be noted, that these documents are not coherent texts or summaries, but they simply group together relevant sentences extracted from product descriptions. Since LDA is a bag of words model, such a corpus of category documents constitutes valid input for the next step.

2. Latent Dirichlet Allocation

Besides identifying entities which are associatively related to a given target, another objective is to organize this knowledge into thematic groups based on different aspects of the target entity and the way it is associated with the entities which have been classified as related. Therefore a model called Latent Dirichlet Allocation (LDA) is utilized.

To run the LDA three parameters must be specified: the topic prior, the word prior and the number of topic clusters, i.e. the number of hidden themes in the corpus that are to be discovered by the model. In one embodiment, the topic prior is set to 50 divided by the number of topics, and the word prior to 0.01. A topic prior of less than 1 ensures a "peaky" distribution of topics in documents, with a few dominant topics distinguished per document. The number of topics for a given corpus of documents should be established empirically. For the food and kitchen domain it was found that a number of topics ten times smaller than the number of categories is optimal.

Software employing collapsed Gibbs sampling as the inference method may be used. With a sampling method, results can be averaged over multiple samples after a number of "burn-in" iterations of the sampler. However, in practice the problem of topic unidentifiability across samples may be introduced. In one embodiment a single sample approximation may be used, taken after the log-likelihood of the corpus has stabilized (for example, in 2500-3000 iterations).

In one experiment, all the words in the documents were rendered in base uninflected form. A stoplist of 113 words was used to remove all numerals and punctuation characters from the documents. The input was also formatted to increase the chance of discovering topics characteristic of associative relations and activities. In addition to using all the words in the documents as input, it is also possible to run a dependency parser over the corpus and retain only predicate expressions (verbs, adjectives and verbial nouns) and their arguments in the original case form (i.e. the case particle was attached to the noun to form a single token). In addition to influencing the topic distributions, the latter option has the advantage of reducing the corpus size and thus shortening the computation time.

The results of LDA consist of inferred topic proportions in each document, as well as word-distribution representations of topics. The topic word distribution allows for the determination of the most common words under a given topic. These are the words which can be used by a human annotator to assign a label to a topic, or through automated means.

Hidden topics discovered by LDA vary in specificity/generality. Some topic clusters are too general for a given domain, for example a topic about eating in the food and kitchen domain. It is possible to find and exclude such topics by looking at the number of categories that were assigned this topic (the more categories the more general and unclear the topic is). In order to avoid topics which are too general, it may be advisable to discard the top X % (e.g. 10%) of topics according to number of documents.

In one embodiment, a supervised LDA is used, such as the relational topic model (RTM), to discover related categories within the product ontology tree. Using RTM, the model can be trained on the existing links between the categories in the product ontology tree and the results can be applied to predicting links between categories which are distant from each other in the category hierarchy tree.

3. Related Category Selection and Topic Assignment

For each target category, which is described by a separate category document, the disclosed invention sorts potential related categories according to the number of sentences in the target category document that either mention the related category or originated from a description of a product in related category. This provides an approximate measure of relation strength between two categories.

Another possible measure of relationship between two categories would be a score calculated directly based on the LDA results, expressed as the probability of seeing the related category candidate given the main category and the topics z, which can be defined as follows in Equation 1:

$$P(c_2 | c_1) = \sum_z P(c_2 | z) P(z | c_1)$$

where the probability of the category document c given topic z is calculated from the Bayes rule (with an additional assumption that all documents are equiprobable) in Equation 2:

$$P(c_i | z_j) = \frac{P(z_j | c_i) P(c_i)}{P(z_j)}$$

In one embodiment, 4 top topics were chosen in the target category document to represent the major themes for that category. While this number is flexible, usually only 3-5 topics are dominant in a single category. For each of those topics, 4 related categories were assigned by iterating over the previously sorted category candidate list and assigning each candidate to a topic based on the following formula (Equation 3), where z is a topic and c is a category.

$$RelZ(c_i, c_j) = \max_z (P(z_k | c_i) + P(z_k | c_j))$$

This corresponds to selecting an overlapping topic which maximizes the probability of both categories under that topic. The topics checked for potential overlap are restricted to top 10 topics in the target and the related candidate category, so it is possible for a candidate to be rejected if there is no overlap.

Another alternative to assign a related category to a topic, would be build a new document consisting of sentences which describe the relationship (for example by extracting all sentences from the main category document which contain the name of the related category). The fitted LDA model could then be used to predict the top topics in the new document using one of the standard LDA prediction methods.

4. Snippet Selection

To select snippets to represents example products in each related category, the disclosed invention uses sentence segments from the target category document as the snippet candidate pool.

Sentences included in the candidate set for a single related category include (a) sentences which contain both the name of the target and the related category, (b) sentences which contain name of one category in the pair and come from descriptions of products in the other category. This means that only one of the category names may appear in the snippet and the other may be present implicitly, since the sentence comes from a description of a product in that category. The name of the category the product belongs to is often not present in descriptions. Instead, it is an implicit or a null argument, for example a description of ramen noodles might not contain the word ramen even though it is referring to noodles. The strategy of allowing only a single category name to be present in the sentence allows for more coverage and more reliable frequency statistics over the sentences.

First, the candidate sentences are filtered by most common argument+predicate structure, where the case argument is a category name. It is assumed that there exists a certain predicative form in which the relation between categories is commonly expressed, but since only one of the category names may be present in the sentence the disclosed invention selects the most frequent category name+case combination out of the two categories in the pair. Next, the system finds the most frequent verb that this category argument depends on in the candidate set. For example, for the category pair cucumber and pickles, the most frequent argument-predicate structure may be to pickle cucumbers.

The candidate sentences with most frequent case and predicate form are then scored depending on how closely the words in them reflect the topic that the related category pair was assigned to. The score is assigned by summing the topic z-scores of the words in each sentence. Z-score is a statistical measure which represents the number of standard deviations by which the appearance of the word in the topic differs from the mean, i.e. its expected frequency regardless of the topic. It is calculated as the difference between raw frequency of word $w_i$ in topic t and the expected frequency of $w_i$ in t, divided by the standard deviation of the corpus (calculated for a binomial distribution), as shown below. N is the number of words in the entire corpus. As in Equation 4, below:

$$zscore(w_i, t) = \frac{count(w_i \mid w \in t) - \left(P(w_i) * \sum_w count(w \mid w \in t)\right)}{N - P(w_i) * (1 - P(w_i))} \quad (2)$$

Another option for sorting the snippet candidates involves using skip-bigram statistics instead of topic z-scores.

5. Topic Page Construction

A topic pages is created by clustering categories related to a given topic and then choosing the most "reliable" clusters to be presented on the page.

The categories are first clustered using one-dimensional k-means clustering, where the distance between the categories is simply the number of edges between the categories in the ontology tree. Each cluster receives a reliability score based on the average of probabilities assigned to the categories in that cluster given the topic. The probability of the category document c given topic z is calculated according to the formula defined in Equation 2, above. Since LDA results provide the probability of each topic given a category, the probability of a category given a topic can be calculated using the Bayes rule, with an additional assumption that all the categories in the corpus are equiprobable. Clusters are sorted according to their reliability scores.

For a cluster to be accepted into the topic page the probability given the topic for the top category in that cluster has to be higher than the average probability in cluster with the highest reliability. In addition, categories below a certain probability threshold in each cluster may be discarded to ensure construction of a more coherent page (the threshold can be established empirically). The label of the cluster is the name of the lowest common ancestor category.

6. Automatic Labeling

Topic labeling generally consists of two stages: (a) label candidate selection followed by (b) label candidate scoring, which allows the system to sort the candidate labels and select the best one(s). In one embodiment of the present invention, two additional stages are added before candidate selection and scoring: (c) classify a topic into one of x number (for example, three) types, and (d) score the subsequent candidate label pool depending on the topic type.

Using the method described in the present disclosure to find associations between product categories based on topics, the system can also find product categories representative for each topic. The system uses this category selection and knowledge from the product category ontology, to classify the topic, in one embodiment, into one of the following types:

i. Semantic Topic. This refers to a topic where 80% or more of product categories selected as representative of the topic, belong to a single subtree in the product category ontology, i.e. they share a common ancestor at 2 levels below root or below.

ii. Product Type Topic. The topic groups categories which belong to multiple subtrees in the category ontology, however, there is a common product type occurring in majority of the categories, which is reflected in the category names. For example, sandals could occur under men's shoes, women's shoes and children's shoes category groups in the ontology. It would then be expected that the word sandal would occur in multiple category names and be a high probability word in the given topic.

iii. Characteristic Feature Topic. The topic groups products of different types which share a common feature (for example elegant or casual), or are used in a single activity (for example steam cooking or cocktail preparation). If the topic was not identified as a Semantic or a Product Type Topic, it automatically falls into this type.

The label candidate pool depends on the determined topic type. As an example, if the topic is determined to be a Semantic Topic, the label is the ancestor category label. If the topic is determined to be a Product Type Topic, the label is chosen based on top 10 most likely words in the topic and names of categories assigned to that topic during topic page creation. If the topic is a Characteristic Feature Topic, the label candidates are selected by ngrams or noun phrases built from most likely words for a given topic or by matching the concept expressed by the topic to the closest electronic encyclopedia article (see Jey Han Lau, Karl Grieser, David Newman, and Timothy Baldwin. Automatic labelling of topic models. In Proceedings of the 49th Annual Meeting of the Association for Computational Linguistics: Human Language Technologies—Volume 1, HLT '11, pages 1536-1545, Stroudsburg, Pa., USA, 2011. Association for Computational Linguistics. Qiaozhu Mei, Xuehua Shen, and ChengXiang Zhai. Automatic labeling of multinomial topic models. In Proceedings of the 13th ACM SIGKDD international conference on Knowledge discovery and data mining, KDD '07, pages 490-499, New York, N.Y., USA, 2007. ACM., each of which is herein incorporated by reference). In addition to topic word multinomials (probabilities of words in the vocabulary given the topic), the system also selects relevant product categories which illustrate the topic's content and the system can use these categories, as well as top topic words, to search for representative products in each relevant category. In one embodiment, select label candidate ngrams are selected from the following:

i. Top 10 most likely words in a given topic.

ii. Names of categories selected to represent the topic and their ancestor categories (parents and above). This is particularly useful if the topic groups mostly products of the same type such as plates or pasta.

iii. Titles of top 50 products chosen for each topic category by searching within that category using top 10 words for that topic. These titles are likely to contain the high probability topic words, but since these are the products which exemplify the topic, they may also include additional useful candidate phrases. Optionally, select sentences from product descriptions or reviews may also be used in addition to the titles, for example sentences which contain words with a high probability in a given topic.

With the exception of a Semantic Topic, where the labels are simply the ancestor category name, the candidates chosen according to the method outlined above can be scored, in one embodiment, as follows. The system assigns the scores based on the formula below to candidate label $l_i$ in the candidate pool L for topic z, where w represents word (sum in the formula is over all words in vocabulary in the corpus), p represents probability, and pointwise mutual information (PMI) is calculated product-wise over the entire category domain corpus. As in Equation 5, below:

$$Score(l_i) = p(l_i \mid L) * \sum_w p(w \mid z) PMI(w, l_i)$$

Additionally, very frequent candidates with generic meaning can be either filtered out based on inverse document frequency (idf), or idf can be incorporated into the score above to normalize label candidate probability. In one example, the idf of term t is the total number of documents divided by number of documents which contain t, or the log of that amount.

Additional Applications

Aside from using associative relation discovery as a Surf-Shopping component, to display categories of products for a user to browse, there are other potential applications on the method, including:

1. Category Page

Given a landing page or a feature page for a category, the results of the method could be used to display related categories.

2. Recommendation

The results of the method could be incorporated into a recommendation system, especially in cases when the user has just purchased an item and they are no longer interested in comparing similar items in a given category, but may want to look at associated categories.

3. Theme Pages

Figure 4:
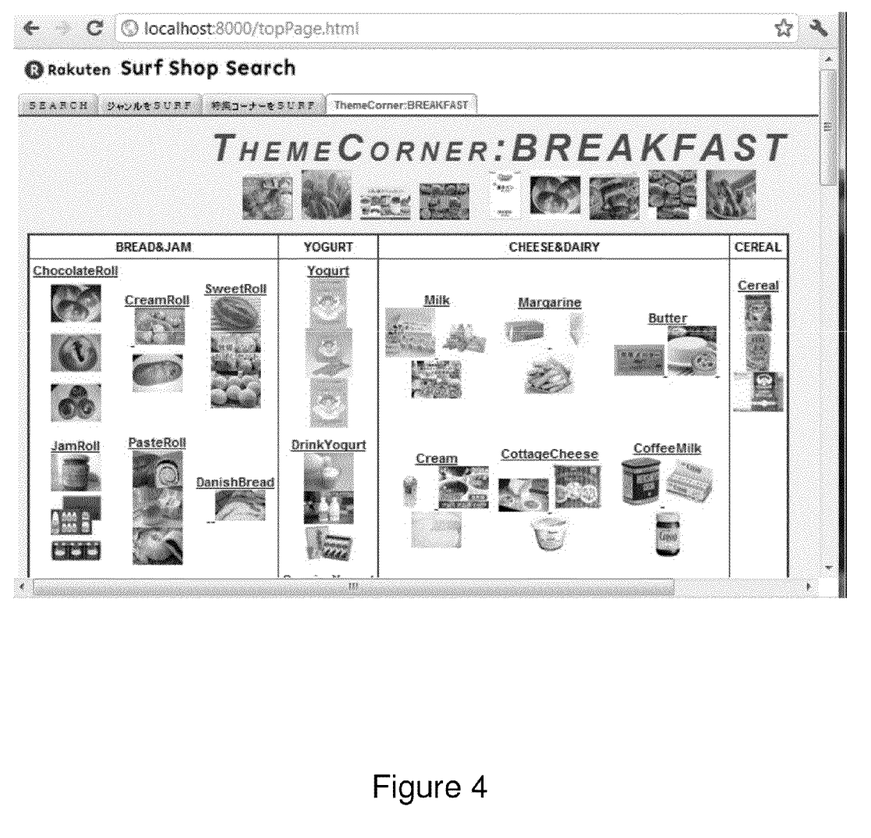

The topic pages created by the method can be used separately from the rest of the results as theme-display pages. A screenshot of an exemplary theme page, according to one embodiment of the disclosed invention, is shown in FIG. 4.

Latent Dirichlet Allocation

The following section provides additional detail on LDA, described briefly above. LDA is a generative topic model which represents each document in a corpus as a mixture of underlying topics. In turn, each topic can be characterized as a multinomial distribution over words. The only observable variables are the words in the documents and the latent topics are assumed to represent underlying themes in the corpus. The basic version of LDA is a bag of words model, where words inside the document are assumed to be exchangeable.

The intuition behind the model is that each document, such as a newspaper article, covers a few underlying topics. For example, an article about funding for a new school may contain content belonging to an education topic, as well as content from a money/budgeting topic. Each word in the article can be assigned a topic label which classifies this word as conveying information about a specific topic.

From the perspective of a generative model, the observed data (words in documents) depends on the on the hidden topic variables. Thus, when a document is created, words inserted into the document are sampled according to the importance of different topics in that document, and according to how likely different words are to appear in a given topic. For instance, if the topic "education" has a high probability in the document, it is likely that the next word could be generated from that topic. Furthermore, it is more likely to be a word with a high probability in the education topic, such as "school".

More formally, the generative process for a document in the collection can be summarized as follows: for each document choose a topic mixture and subsequently choose each word in the document, conditioned on (a) a topic selected from the document specific topic mixture and (b) the word distribution for that topic. The generation of a document in described in more detail below.

The LDA model and its parameters are represented graphically in the figure below. The graphical model shows a corpus of D documents, $N_d$ words each. In addition, there are K topics in the corpus, where each topic $\beta$ corresponds to a multinomial distribution over words found in the corpus. $z_{d,n}$ is the topic label assigned to the $n^{th}$ word in document d. Besides the word level variable z, there is also the document level variable $\Theta$, where $\Theta_d$ parametrizes the multinomial over topics in document d. Finally, $\alpha$ and $\eta$ are parameters on the Dirichlet priors from which the topic distributions in the document and the word distributions in the topics are sampled during the generative process.

Given the variables defined above, the generative process illustrated in FIG. 1 can be defined in terms of the following steps:

1. Choose $\Theta_d \sim \text{Dir}(\alpha)$, where $d \in \{1, \ldots, D\}$
2. Choose $\beta_k \sim \text{Dir}(\eta)$, where $k \in \{1, \ldots, K\}$
3. For each of the words $w_{d,n}$, where $n \in \{1, \ldots, N_d\}$:
   (a) first choose a topic $z_{d,n} \sim \text{Multinomial}(\Theta_d)$,
   (b) then choose a word $w_{d,n} \sim \text{Multinomial}(\beta_{z_{d,n}})$.

Thus, it can be observed that the choice of a topic label z for a given word in document d depends on the multinomial distribution of topics in the document parameterized by $\Theta_d$. In turn, the choice of a word depends on the topic z selected for that word and the distribution of words in that topic. These dependencies are also visible in the joint probability distribution for all the hidden and observed variables taking part in the generative process, which is shown below in Equation 6.

$$p(\beta_{1:K}, \theta_{1:D}, z_{1:D}, w_{1:D}) = \prod_{k=1}^{K} p(\beta_k) \prod_{d=1}^{D} p(\theta_d) \left( \prod_{n=1}^{N} p(z_{d,n} \mid \theta_d) p(w_{d,n} \mid \beta_{1:K}, z_{d,n}) \right) \quad (3)$$

The joint distribution presented above illustrates the probabilistic assumptions behind the generative model. However, it is valid for a single setting of the model's parameters where the values of latent variables $\Theta$, $\beta$ and the z's are assumed to be known. In reality, the only given part of the model consists of the words observed in the documents in the collection. Thus, the task of estimating the model's variable settings, also referred to as inference or posterior computation, involves finding the conditional distribution of all the hidden variables given the observed corpus, as stated below in Equation 7.

$$p(\beta_{1:K}, \Theta_{1:D}, z_{1:D} \mid w_{1:D}) = \frac{p(\beta_{1:K}, \Theta_{1:D}, z_{1:D}, w_{1:D})}{P(w_{1:D})} \qquad (4)$$

The numerator on the right side is simply the joint distribution of all the random variables in a single "version" of the model. The denominator represents the marginal probability of the corpus under any setting of the hidden variables. In theory it could be computed by summing over all the possible versions of the topic model, but this sum is intractable due to the number of possible topic label assignments over the words in the corpus.

Therefore, the posterior of the model is typically estimated using techniques such as variational inference or sampling methods, most frequently Gibbs sampling. In case of a sampling method, the estimate may be computed by averaging over multiple samples or alternatively a single sample approximation may be used. The implementation of LDA may employ a collapsed Gibbs sampling.

The invention described above is operational with general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Components of the inventive computer system may include, but are not limited to, a processing unit, a system memory, and a system bus that couples various system components including the system memory to the processing unit. The computer system typically includes a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, a peer device or other common network node, and typically includes many or all of the elements described above relative to the computer. The logical connections depicted in include one or more local area networks (LAN) and one or more wide area networks (WAN), but may also include other networks. Such networking environments are commonplace in offices, enterprise-wide computer networks, intranets and the Internet.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

What is claimed is:

1. A computer implemented method for determining associative relationships comprising:
    applying a programmed controlled process to select a category comprising a plurality of similar products stored in a database, wherein each of the plurality of similar products has a stored description;
    constructing a category document associated with the category, comprising:
        collecting the descriptions of each of the products within the category;
        deleting a description that is a duplicate of another description; and
        retaining descriptions of the category relating to one or more other categories;
    applying the category document to a topic model to determine topics;
    selecting related categories for the category document;
    assigning one or more of said related categories to the determined topics;
    selecting one or more of said retained descriptions from the category document to illustrate the relationship between the category document and a second category document associated with one of the related categories;
    wherein said selected descriptions of the category document comprise all sentences from the descriptions of the products in the category document which mention the name of the category associated with the second category document;
    selecting an exemplary product based on the selected descriptions; and
    building a topic page.

2. The computer implemented method of claim 1, wherein said topic model applies a Latent Dirichlet Allocation algorithm.

3. The computer implemented method of claim 1, wherein building said topic page comprises k-means clustering to group topics together according to distance in a product ontology tree.

4. The computer implemented method of claim 1, wherein the number of topics determined is at least ten times less than the number of categories.

5. The computer implemented method of claim 1, wherein selecting related categories comprises sorting potential related categories according to the number of sentences in the category document that either mention one of the related categories or originated from a description of a product in one of the related categories.

6. A system for determining associative relationships comprising: a data processor programmed to:
- select a category comprising a plurality of similar products, wherein each of the plurality of similar products has a description;
- construct a category document associated with the category, comprising:
  - collecting the descriptions of each of the products within the category;
  - deleting a description that is a duplicate of another description; and
  - retaining descriptions of the category relating to one or more other categories;
- apply the category document to a topic model to determine topics;
- select related categories for the category document;
- assign one or more of said related categories to the determined topics;
- select one or more of said retained descriptions from the category document to illustrate the relationship between the category document and a second category document associated with one of the related categories;
- wherein said selected descriptions of the category document comprise all sentences from the descriptions of the products in the category document which mention the name of the category associated with the second category document;
- select an exemplary product based on the selected descriptions; and
- build a topic page.

7. The system of claim 6, wherein said topic model uses a Latent Dirichlet Allocation algorithm (LDA).

8. The system of claim 6, wherein said data processor is further programmed to: build said topic page using LDA results to select product categories which represent the topic; and group those categories together, using k-means clustering, according to distance in a product ontology tree.

9. The system of claim 6, wherein the number of topics determined is at least ten times less than the number of categories.

10. The system of claim 6, wherein selecting related categories comprises sorting potential related categories according to the number of sentences in the category document that either mention one of the related categories or originated from a description of a product in one of the related categories.

11. A non-transitory computer readable storage medium containing programming, that when executed on a data processor, causes the data processor to perform steps comprising:
- selecting a category comprising a plurality of similar products, wherein each of the plurality of similar products has a description;
- constructing a category document associated with the category, comprising:
  - collecting the descriptions of each of the products within the category;
  - deleting a description that is a duplicate of another description; and
  - retaining descriptions of the category relating to one or more other categories;
- applying the category document to a topic model to determine topics;
- selecting related categories for the category document;
- assigning one or more of said related categories to the determined topics;
- selecting one or more of said retained descriptions from the category document to illustrate the relationship between the category document and a second category document associated with one of the related categories;
- wherein said selected descriptions of the category document comprise all sentences from the descriptions of the products in the category document which mention the name of the category associated with the second category document;
- selecting an exemplary product based on the selected descriptions; and
- building a topic page.

12. The non-transitory computer readable storage medium of claim 11, wherein said topic model uses a Latent Dirichlet Allocation algorithm.

13. The non-transitory computer readable storage medium of claim 11, wherein building said topic page comprises k-means clustering to group topics together according to distance in a product ontology tree.

14. The non-transitory computer readable storage medium of claim 11, wherein the number of topics determined is at least ten times less than the number of categories.

15. The non-transitory computer readable storage medium of claim 11, wherein selecting related categories comprises sorting potential related categories according to the number of sentences in the category document that either mention one of the related categories or originated from a description of a product in one of the related categories.

* * * * *